United States Patent [19]

Laing

[11] Patent Number: 5,094,593
[45] Date of Patent: Mar. 10, 1992

[54] CIRCULATION DEVICE WITH RESISTANCE HEATING

[76] Inventor: Karsten Laing, Hofener Weg 35, Remseck 2, D-7148, Fed. Rep. of Germany

[21] Appl. No.: 612,403

[22] Filed: Nov. 9, 1990

[30] Foreign Application Priority Data

Nov. 10, 1989 [DE] Fed. Rep. of Germany ....... 3937589

[51] Int. Cl.⁵ ............................................. F04B 39/06
[52] U.S. Cl. ..................................... 417/313; 417/207
[58] Field of Search .......................... 417/313, 50, 207; 222/146.2, 146.5

[56] References Cited

U.S. PATENT DOCUMENTS

| | | | |
|---|---|---|---|
| 4,537,345 | 8/1985 | Brown | 236/11 |
| 4,640,667 | 2/1987 | Trepp | 417/207 |
| 4,776,767 | 10/1988 | Motomura | 417/50 |
| 4,936,289 | 6/1990 | Peterson | 417/300 |

*Primary Examiner*—Richard A. Bertsch
*Assistant Examiner*—Charles Freay
*Attorney, Agent, or Firm*—Henri J. A. Charmasson

[57] ABSTRACT

In a heating and recirculating system for a tank of chemical fluid, the recirculation pump is preceded by a heating element housed in the distal half of a tubular housing mounted coaxially within the pipe feeding the pump. The fluid is uniformly heated as it circulates through the annular channel defined between the pipe and the heating element housing.

5 Claims, 1 Drawing Sheet

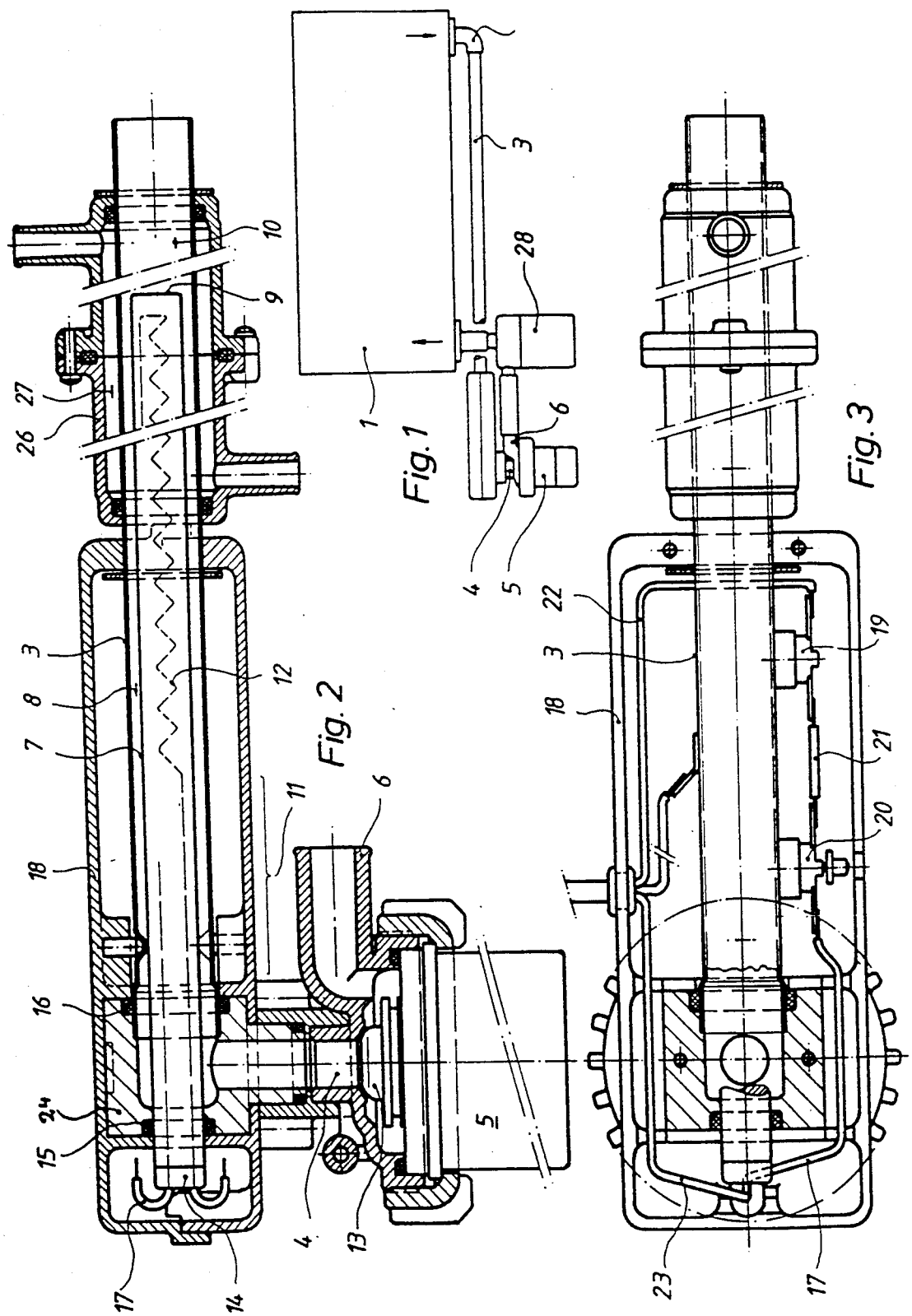

CIRCULATION DEVICE WITH RESISTANCE HEATING

BACKGROUND OF THE INVENTION

The invention refers to the combination of a circulation pump and a resistance heater to heat up and/or to maintain the temperature of a body of fluid. While the heat input into a water circuit does not create any problems because the high heat capacity of the water allows heating elements with very high performance per unit of surface, heating devices for heating up and subsequently maintaining the temperature in photochemical baths create major problems, because too high wall temperatures of the heating elements may cause decomposition of the sensitive chemicals. Some developing solutions can only stand excess temperatures of 6 K., which is only achievable with a very low power density. Such low wall temperatures require large heating coils. The casing of these heating coils leads to large fluid cross sections which make it impossible to avoid dead zones, zones in which the relative velocity of the fluid is zero. Since the supply of energy is distributed equally over the length of the heating element, the unwanted overheating will appear in such dead zones. With the increase in length the heat capacity of the heating coil increases which complicates the temperature control.

There will always be a temperature distribution at the exit area which reflects the temperature difference between the current paths which flow laminar due to the low velocity. This means that the temperature sensor which is installed to keep the temperature constant may be exposed to a current path which is either too hot or too cold. In developing baths which allow only a temperature difference of 0.1 K. this can be extremely harmful.

One finds analogous conditions in holding the temperature of baths constant, especially in medical bathroom installations even if the requirement for a constant temperature here allows a range of variation of 1 K. To a certain extent also in this application the overheating is harmful because calcareous deposits are formed in the hottest areas whereby the heating coil in the course of time will be covered with an insulating layer of scale which can lead to destruction of the heating coil by local overheating and thus to a connection between live parts and the bath water.

In the circulation of coolants it is also important to have only a slight excess temperature because the evaporation enthalpy of coolants lies by tenth power under the one of water. In overheated areas therefore vapor develops which creates loud noises in the system and which can lead to further local overheating of the heating elements and thus, at higher overheating temperatures, may cause decomposition of the coolant.

The invention avoids these drawbacks. According to the invention the circulation flow to be heated will be conveyed through a tube which contains a tubular resistance heating element which is closed on one side. The surface of the tubular heating element and the inner wall of the surrounding tube form an annular clearance of small radial extension. In this annular clearance all current paths experience a uniform and equally high temperature increase. Thereby a local overheating is absolutely eliminated. Due to this uniform heating the temperature sensor can be attached to the tubular heating element whereby a good heat conductivity of the connection is important. At the outlet of the tube a circulation pump is arranged. This makes it possible to mount the temperature sensor and the necessary safety thermostat close to the electrically driven pump whereby cables along the tube can be avoided. It has been found that the mounting of the pump on the suction side leads to an extremely uniform velocity of the current paths which run along the tubular resistance heating element.

The invention will be described with the help of figures.

BRIEF DESCRIPTION OF THE DRAWING

FIG. 1 shows the complete unit.

FIG. 2 shows a cross-section through the pump connection area.

FIG. 3 shows a view from above into the open pump- and connection area.

DESCRIPTION OF THE PREFERRED EMBODIMENT OF THE INVENTION

FIG. 1 shows a tank 1 filled with developer liquid. The liquid flows through elbow 2 into tube 3, the length of which is equal to the width of tank 1. The fluid then reaches the suction side 4 of the pump with motor 5 and is conveyed through outlet nipple 6 into filter 28 from where it returns to the tank 1 on the opposite side of elbow 2.

FIG. 2 shows a cross-section in a vertical plane whereby tube 3 is not shown in total length. Heating tube 7 forms together with tube 3 the annular clearance 8. Its closed end 9 points towards the direction of flow so that the fluid coming from tube 10 enters the annular clearance 8 uniformly. Due to the uniform velocity distribution, caused by the arrangement of the pump on the suction side, the surface of the heating tube 7 is loaded uniformly so that the temperature increase of the fluid conveyed along the heating tube is linear. Thus area 11 of tube 3 which lies behind the area of tube 7, which is heated by resistance heating element 12, shows a constant temperature over the circumference. The throughflow then reaches the suction side 4 of the centrifugal pump with impeller 13 and exits through outlet 6. The use of a heating element which is supplied with electricity from its end section 14 leads to a simple design because the heating element has to be sealed only in one area by O-ring 15 and tube 3 by O-ring 16 so that the electrical connections 17 can be wired to the temperature sensor and the safety switch within the housing 18.

FIG. 3 shows a view from the top of the open housing 18 with temperature sensor 20 and temperature safety switch 19 which both are connected to and in good thermal contact with tube 3. The temperature sensor is arranged in area 11 which is outside the heated area. At the same time the wiring 17, 21, 22, 23 is shown. Because the temperatures of the developer are close to the normal room temperatures there may be problems at extreme high temperatures in summertime when the room temperature can be above the temperature for the developer. In this case a further tube 26 is provided in which tube 3 is arranged so that a cooling liquid can be conveyed through the annular space 27 in counterflow to the direction of circulation.

I claim:

1. In combination with a tank having a fluid recirculating outlet and a fluid recirculating inlet, an apparatus for precisely regulating the temperature of a body of fluid in the tank which comprises:
- a fluid recirculation pump having a suction port;
- a conduit connecting said outlet to the suction port of the pump, said conduit having an inner wall having a larger cross-diameter than said suction port;
- a closed tubular housing mounted coaxially into said conduit proximate the suction port of the pump and, said housing having an outer wall defining an annular flow chamber within the inner wall of the conduit;
- a heating element within a first half section of said housing most distal from the pump;
- a temperature sensor in contact with a first part of the conduit surrounding a second half section of the housing proximate to the suction port of the pump; and
- means responsive to said temperature sensor for controlling the operation of the heating element.

2. The combination of claim 1 which further comprises a temperature-sensitive safety switch in contact with a second part of the conduit surrounding said first half section of the housing.

3. The combination of claim 2 which further comprises an enclosure surrounding said temperature sensor and said temperature-sensitive safety switch.

4. The combination of claim 3 which further comprises a connecting tube projecting laterally from the proximal end of said first part into the suction port of the pump.

5. The combination of claim 4 which further comprises a cooling chamber coaxially mounted around a portion of the second part of the conduit.

* * * * *